(12) United States Patent
Hashimoto et al.

(10) Patent No.: US 11,241,749 B2
(45) Date of Patent: Feb. 8, 2022

(54) ELECTRICAL DISCHARGE MACHINING METHOD AND ELECTRICAL DISCHARGE MACHINING DEVICE

(71) Applicant: Mitsubishi Hitachi Power Systems, Ltd., Kanagawa (JP)

(72) Inventors: Takuro Hashimoto, Yokohama (JP); Koichi Akagi, Yokohama (JP); Naoya Fujita, Yokohama (JP); Takanobu Ogata, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 384 days.

(21) Appl. No.: 16/339,852

(22) PCT Filed: Oct. 17, 2017

(86) PCT No.: PCT/JP2017/037433
§ 371 (c)(1),
(2) Date: Apr. 5, 2019

(87) PCT Pub. No.: WO2018/096837
PCT Pub. Date: May 31, 2018

(65) Prior Publication Data
US 2019/0291197 A1    Sep. 26, 2019

(30) Foreign Application Priority Data
Nov. 25, 2016   (JP) ............................. JP2016-228780

(51) Int. Cl.
*B23H 7/00*      (2006.01)
*B23H 9/10*      (2006.01)
(Continued)

(52) U.S. Cl.
CPC ................ *B23H 7/00* (2013.01); *B23H 1/00* (2013.01); *B23H 7/22* (2013.01); *B23H 7/26* (2013.01);
(Continued)

(58) Field of Classification Search
CPC ... B23H 9/10; B23H 1/04; B23H 7/30; B23H 7/00; B23H 7/26; B23H 7/22; B23H 1/00;
(Continued)

(56) References Cited

U.S. PATENT DOCUMENTS

2004/0124181 A1 * 7/2004 Wei .......................... B23H 9/10
                                                                  219/68
2006/0240184 A1   10/2006 Ochiai et al.
(Continued)

FOREIGN PATENT DOCUMENTS

JP    59001125 A  *  1/1984  ............... B23H 9/10
JP    03-073221          3/1991
(Continued)

OTHER PUBLICATIONS

Notification of Reason for Refusal dated Jun. 3, 2020 in corresponding Korean Patent Application No. 10-2019-7008020, with English Translation.
(Continued)

*Primary Examiner* — Geoffrey S Evans
(74) *Attorney, Agent, or Firm* — Wenderoth, Lind & Ponack, L.L.P.

(57) ABSTRACT

An electrical discharge machining method includes selectively immersing only a portion of a workpiece in an electrical discharge machining liquid such that a machining object portion included in the portion of the workpiece is opposed to an electrode immersed in the electrical discharge machining liquid and applying an electrical discharge
(Continued)

machining to the machining object portion by applying a voltage between the electrode and the workpiece in a state where the portion of the workpiece is selectively immersed in the electrical discharge machining liquid.

8 Claims, 9 Drawing Sheets

(51) Int. Cl.
| | |
|---|---|
| B23H 7/22 | (2006.01) |
| B23H 7/26 | (2006.01) |
| F01D 5/14 | (2006.01) |
| F01D 9/02 | (2006.01) |
| F01D 25/00 | (2006.01) |
| B23H 1/00 | (2006.01) |
| F04D 29/38 | (2006.01) |
| F02C 7/00 | (2006.01) |

(52) U.S. Cl.
CPC ............... *B23H 9/10* (2013.01); *F01D 5/14* (2013.01); *F01D 9/02* (2013.01); *F01D 25/00* (2013.01); *F02C 7/00* (2013.01); *F04D 29/38* (2013.01); *F05D 2220/3219* (2013.01); *F05D 2230/12* (2013.01)

(58) Field of Classification Search
CPC ... F01D 5/14; F01D 9/02; F01D 25/00; B23Q 3/063
See application file for complete search history.

(56) References Cited

U.S. PATENT DOCUMENTS

| | | | | |
|---|---|---|---|---|
| 2007/0119040 | A1* | 5/2007 | Jones | B25B 5/04 |
| | | | | 29/428 |
| 2008/0028607 | A1* | 2/2008 | Lamphere | B23H 9/10 |
| | | | | 29/889.7 |
| 2008/0134505 | A1* | 6/2008 | Gabriel | B23Q 3/063 |
| | | | | 29/889.2 |
| 2010/0301017 | A1 | 12/2010 | Luo | |
| 2012/0096715 | A1* | 4/2012 | Hlavaty | B23Q 3/063 |
| | | | | 29/889.2 |
| 2018/0087385 | A1* | 3/2018 | Weaver | B23P 15/04 |

FOREIGN PATENT DOCUMENTS

| | | |
|---|---|---|
| JP | 2010-100940 | 5/2010 |
| JP | 2010-274412 | 12/2010 |
| JP | 2013-221162 | 10/2013 |
| KR | 20-0387229 | 6/2005 |

OTHER PUBLICATIONS

International Search Report dated Jan. 16, 2019 in International (PCT) Application No. PCT/JP2017/037433, with English translation.

International Preliminary Report on Patentability dated Jun. 6, 2019 in International (PCT) Application No. PCT/JP2017/037433, with English translation.

\* cited by examiner

EXTENDING DIRECTION OF BLADE GROOVE

FIG. 4

WIDTH DIRECTION

EXTENDING DIRECTION OF BLADE GROOVE

FIG. 7

WIDTH DIRECTION

ELECTRICAL DISCHARGE MACHINING METHOD AND ELECTRICAL DISCHARGE MACHINING DEVICE

TECHNICAL FIELD

The present disclosure relates to an electrical discharge machining method and an electrical discharge machining device.

BACKGROUND ART

Conventionally, a grinding device or a polishing device may be used for machining a workpiece, which is an object to be processed. For instance, each tip surface of blades used in rotary machines such as gas turbines and compressors is typically processed by grinding a blade tip surface with a grinding material such as sand paper.

However, when the grinding device and the polishing device are used, processing accuracy is likely to be low. Further, it is necessary to cure a part other than the tip surfaces of the blades so as to protect the blades from cut-off powder produced by grinding, causing a large amount of work time required.

Patent Document 1 discloses a method for machining a blade shape of a turbine blade as a workpiece by using not a grinding device and a polishing device but an electrical discharge machining device. In the processing method described in Patent Document 1, a pair of electrodes is fixed in an electrical discharge machining liquid, then, the turbine blade is moved in a horizontal direction between the electrodes to perform the electrical discharge machining.

CITATION LIST

Patent Literature

Patent Document 1: JP2010-274412A

SUMMARY

Problems to be Solved

In the processing method described in Patent Document 1, the electrical discharge machining is performed in a state where the entire workpiece is immersed in the electrical discharge machining liquid. Thus, it takes a lot of time and cost to clean up the workpiece after the electrical discharge machining.

At least one embodiment of the present invention was made in view of the above typical problem, and an object is to provide an electrical discharge machining method and an electrical discharge machining device capable of reducing time and cost required for the cleaning process of the workpiece after the electrical discharge machining.

Solution to the Problems (1) An electrical discharge machining method according to at least one embodiment of the present invention, comprises: a step of selectively immersing only a portion of a workpiece in an electrical discharge machining liquid such that a machining object portion included in the portion of the workpiece is opposed to an electrode immersed in the electrical discharge machining liquid; and a step of applying an electrical discharge machining to the machining object portion by applying a voltage between the electrode and the workpiece in a state where the portion of the workpiece is selectively immersed in the electrical discharge machining liquid, the portion including the machining object portion.

According to the electrical discharge machining method described in the above (1), since the electrical discharge machining is performed in a state where only the portion of the workpiece which includes the machining object portion is selectively immersed in the electrical discharge machining liquid, it is possible to reduce time and cost required for the cleaning process of the workpiece after the electrical discharge machining. In the above (1), the phrase "selectively immersing only a portion of a workpiece, which includes a machining object portion, in an electrical discharge machining liquid" means for immersing the portion including the machining object portion of the workpiece in the electrical discharge machining liquid and not for immersing portions other than the portion including the machining object portion of the workpiece in the electrical discharge machining liquid.

(2) In some embodiments, in the electrical discharge machining method described the above (1), the method further comprises a step of attaching the workpiece to a feed unit of an electrical discharge machine, in which the step of immersing in the electrical discharge machining liquid, the workpiece moves to the electrode by the feed unit while the electrode is kept stationary.

According to the electrical discharge machining method described in the above (2), which is different from the typical electrical discharge machining method, the workpiece instead of the electrode is attached to the feed unit of the electrical discharge machine so that the workpiece is capable of moving. Then, it is possible to easily realize the electrical discharge machining in a state where only the portion of the workpiece is selectively immersed in the electrical discharge machining liquid. Accordingly, as describe in the above (1), it is possible to reduce time and cost required for the cleaning process of the workpiece after the electrical discharge machining.

(3) In some embodiments, in the electrical discharge machining method described the above (1) or (2), in the step of immersing in the electrical discharge machining liquid, the workpiece moves to the electrode from above the electrode toward the electrode by the feed unit such that a lower surface of the machining object portion of the workpiece is opposed to an upper surface of the electrode.

According to the electrical discharge machining method described in the above (3), it is possible to easily oppose the machining object portion of the workpiece to the electrode. Then, it is possible to easily realize the electrical discharge machining in a state where only the portion of the workpiece is selectively immersed in the electrical discharge machining liquid. Accordingly, as describe in the above (1), it is possible to reduce time and cost required for the cleaning process of the workpiece after the electrical discharge machining.

(4) In some embodiments, in the electrical discharge machining method described any one of the above (1) to (3), in the step of applying the electrical discharge machining to the machining object portion, the electrical discharge machining is performed on a blade tip surface as the machining object portion of a blade as the workpiece.

For instance, the tip surfaces of blades used in rotary machines such as gas turbines and compressors are typically machined by grinding the blade tip surface with a grinding material such as sand paper. At this time, it is necessary to cure a portion other than the tip surfaces of the blades so as to protect the blades from cut-off powder produced by grinding, causing a large amount of work time required.

According to the electrical discharge machining method described in the above (4), applying the electrical discharge machining to the blade tip surface of the desired shape does not require the curing operation needed for performing the grinding process which is a typical machining method for the blade tip surface. Thus, it is possible to reduce time and cost required for machining the blade tip surface. Further, as described in the above (1), since it is possible to limit the portion immersed in the electrical discharge machining liquid during the electrical discharge machining by performing the electrical discharge machining in a state where the portion of the blade which includes the blade tip surface is selectively immersed in the electrical discharge machining liquid, which enables to reduce time and cost required for the cleaning process of the blade after the electrical discharge machining.

(5) In some embodiments, in the electrical discharge machining method described the above (4), in the step of immersing in the electrical discharge machining liquid, only a portion of the blade on a tip side relative to a root portion is immersed in the electrical discharge machining liquid.

According to the electrical discharge machining method described in the above (5), when a coating is applied to a bearing surface of the root portion of the blade for the purpose of preventing seizure, for instance, not immersing the root portion in the electrical discharge machining liquid eliminates the need for cleaning the root portion.

In an embodiment, if the workpiece is a gas turbine blade, the electrical discharge machining may be performed on the tip surface of the gas turbine blade while only the tip portion of the gas turbine blade is immersed in the electrical discharge machining liquid so as not to prevent the electrical discharge machining liquid from entering a cooling hole provided on a blade profile or a platform of the gas turbine blade.

(6) In some embodiments, in the electrical discharge machining method described the above (4) or (5), the blade is a rotor blade in a downstream stage of a compressor of a gas turbine.

According to the electrical discharge machining method described in the above (6), since the compressor rotor blade of the downstream stage which is comparatively lightweight is used as a processing object, the workpiece (blade) can be attached to the feed unit of the electrical discharge machine while satisfying constraints caused by specifications of the electrical discharge machining. Further, the workpiece (blade) is attached to the feed unit of the electrical discharge machine, thus, it is possible to easily realize the electrical discharge machining in a state where only the portion of the workpiece is selectively immersed in the electrical discharge machining liquid.

(7) In some embodiments, in the electrical discharge machining method described any one of the above (4) to (6), the method comprises a step of fitting a root portion of the blade into a blade groove of a blade holder and attaching the blade to a feed unit of an electrical discharge machine via the blade holder, in which in the step of immersing in the electrical discharge machining liquid, the blade moves to the electrode by the feed unit while the electrode is kept stationary.

According to the electrical discharge machining method described in the above (7), which is different from the typical electrical discharge machining method, the blade (workpiece) instead of the electrode is attached to the feed unit of the electrical discharge machine so that the blade is capable of moving. Then, it is possible to easily realize the electrical discharge machining in a state where only the portion of the blade is selectively immersed in the electrical discharge machining liquid. Accordingly, as describe in the above (1), it is possible to reduce time and cost required for the cleaning process of the blade after the electrical discharge machining.

(8) In some embodiments, in the electrical discharge machining method described the above (7), the method further comprises a step of pressing the blade by a datum part provided on the blade holder such that a bearing surface of the root portion contacts with a wall surface of the blade groove.

According to the electrical discharge machining method described in the above (8), the bearing surface of the root portion is brought into contact with the wall surface of the blade groove, then the blade can be positioned relative to the blade holder with respect to at least the blade height direction. Accordingly, it is possible to improve accuracy of electrical discharge machining.

Further, a typical blade bearing surface extends obliquely relative to the blade height direction. As described above, if the bearing surface of the root portion is brought into contact with the wall surface of the blade groove, the blade is positioned with respect to not only the blade height direction but also a width direction of the blade root portion. Accordingly, it is possible to improve accuracy of electrical discharge machining.

(9) In some embodiments, in the electrical discharge machining method described the above (7) or (8), the method further comprises a step of bringing one end face of the root portion of the blade in an extending direction of the blade groove into contact with a datum block inserted into the blade groove.

According to the electrical discharge machining method described in the above (9), the one end face of the root portion of the blade is brought into contact with the datum block, then the blade can be positioned with respect to the extending direction of the blade groove. Accordingly, it is possible to improve accuracy of electrical discharge machining.

(10) An electrical discharge machining device for a blade according to at least one embodiment of the present invention comprises: a feed unit; a blade holder attached to the feed unit and having a blade groove into which a root portion of the blade is fittable; an electrode immersed in an electrical discharge machining liquid; and a power source for applying a voltage between the blade and the electrode.

According to the electrical discharge machining device described in the above (10), the electrical discharge machining can be performed in a state where only the tip side of the blade is immersed in the electrical discharge machining liquid, thus, it is possible to reduce time and cost required for the cleaning process of the blade after the electrical discharge machining.

(11) In some embodiments, in the electrical discharge machining device described the above (10), the blade holder includes a datum part for pressing the blade toward a wall surface of the blade groove such that a bearing surface of the root portion is brought into contact with the wall surface.

According to the electrical discharge machining device described in the above (11), the bearing surface of the root portion is brought into contact with the wall surface of the blade groove, then the blade can be positioned relative to the blade holder with respect to at least the blade height direction. Accordingly, it is possible to improve accuracy of electrical discharge machining.

Further, a typical blade bearing surface extends obliquely relative to the blade height direction. As described above, if the bearing surface of the root portion is brought into contact with the wall surface of the blade groove, the blade is positioned with respect to not only the blade height direction but also a width direction of the blade root portion. Accordingly, it is possible to improve accuracy of electrical discharge machining.

(12) In some embodiments, in the electrical discharge machining device described the above (10) or (11), the device further comprises a datum block configured to be at least partially inserted into the blade groove of the blade holder such that one end face of the root portion of the blade in an extending direction of the blade groove is brought into contact with the datum block.

According to the electrical discharge machining device described in the above (12), the one end face of the root portion of the blade is brought into contact with the datum block, then the blade can be positioned with respect to the extending direction of the blade groove. Accordingly, it is possible to improve accuracy of electrical discharge machining.

(13) In some embodiments, in the electrical discharge machining device described any one of the above (10) to (12), an upper surface of the electrode includes a curved concave surface shape.

According to the electrical discharge machining device described in the above (13), the electrical discharge machining is performed on the blade tip surface in a state where only the tip side of the blade is immersed in the electrical discharge machining liquid, which makes to facilitate machining in a curved convex shape and makes it possible to reduce time and cost required for the cleaning process of the blade after the electrical discharge machining.

Advantageous Effects

According to at least one embodiment of the present invention, an electrical discharge machining method and an electrical discharge machining device capable of reducing time and cost required for the cleaning process of the workpiece after the electrical discharge machining are provided.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
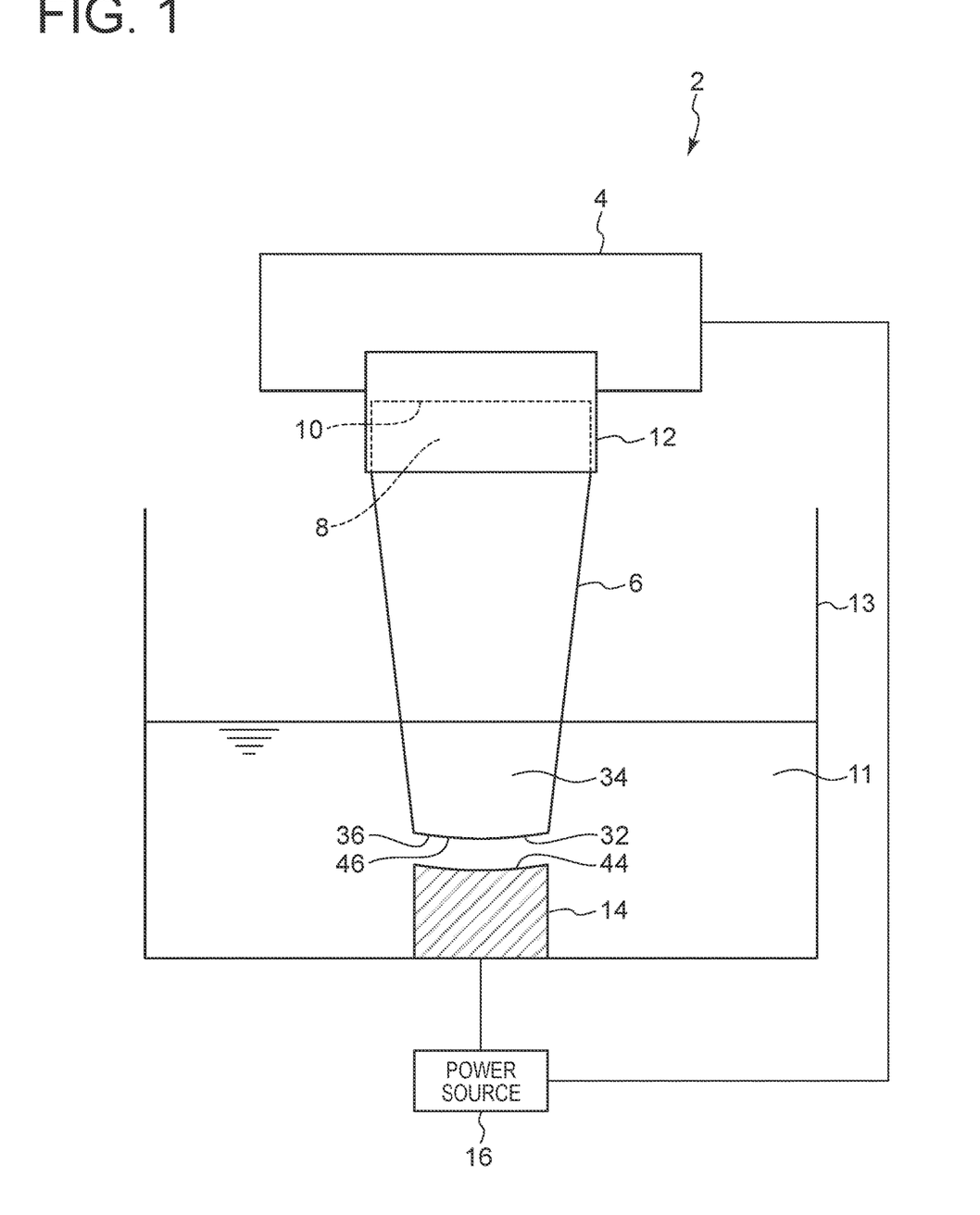
FIG. 1 is a schematic view showing a schematic configuration of an electrical discharge machining device 2 according to an embodiment of the present invention.

FIG. 1 is a schematic view showing a schematic configuration of an electrical discharge machining device 2 according to an embodiment of the present invention.

As shown in FIG. 1, the electrical discharge machining device 2 includes a feed unit 4, a blade holder 12 attached to the feed unit 4 and having a blade groove 10 into which a root portion 8 of a blade 6 (workpiece) is fittable, a container 13 accommodating an electrical discharge machining liquid 11, an electrode 14 immersed in the electrical discharge machining liquid in the container 13, and a power source 16 for applying a voltage between the blade 6 and the electrode 14. The blade 6 is a blade mounted on a rotor (not shown) of a rotary machine such as a gas turbine or a compressor, for example.

The feed unit 4 is configured to move the blade holder 12 holding the blade 6 by a driving force of a motor, which is not shown, in three axial directions orthogonal to each other.

The electrical discharge machining liquid 11 is a dielectric liquid filling a gap between the blade 6 and the electrode 14 in the electrical discharge machining device 2. The electrical discharge machining liquid 11 acts as an insulator, ionizes when a discharge occurs, and functions to maintain an electric field in which current flows. Further, the electrical discharge machining liquid 11 flowing through the gap serves to remove machining waste from the gap. For instance, a liquid containing water having a specific resistance adjusted to 1 to 10×10000 Ω·cm or oil having extremely high specific resistance as a main component is preferably used for the electrical discharge machining liquid 11.

A high electrically conductive material such as graphite and copper is preferably used for the electrode 14. Further, a pulse power source is preferably used for the power source 16. The upper surface 44 of the electrode 14 includes a curved concave surface shape as an inverted shape of the target shape of the blade tip surface 36.

Figure 2:
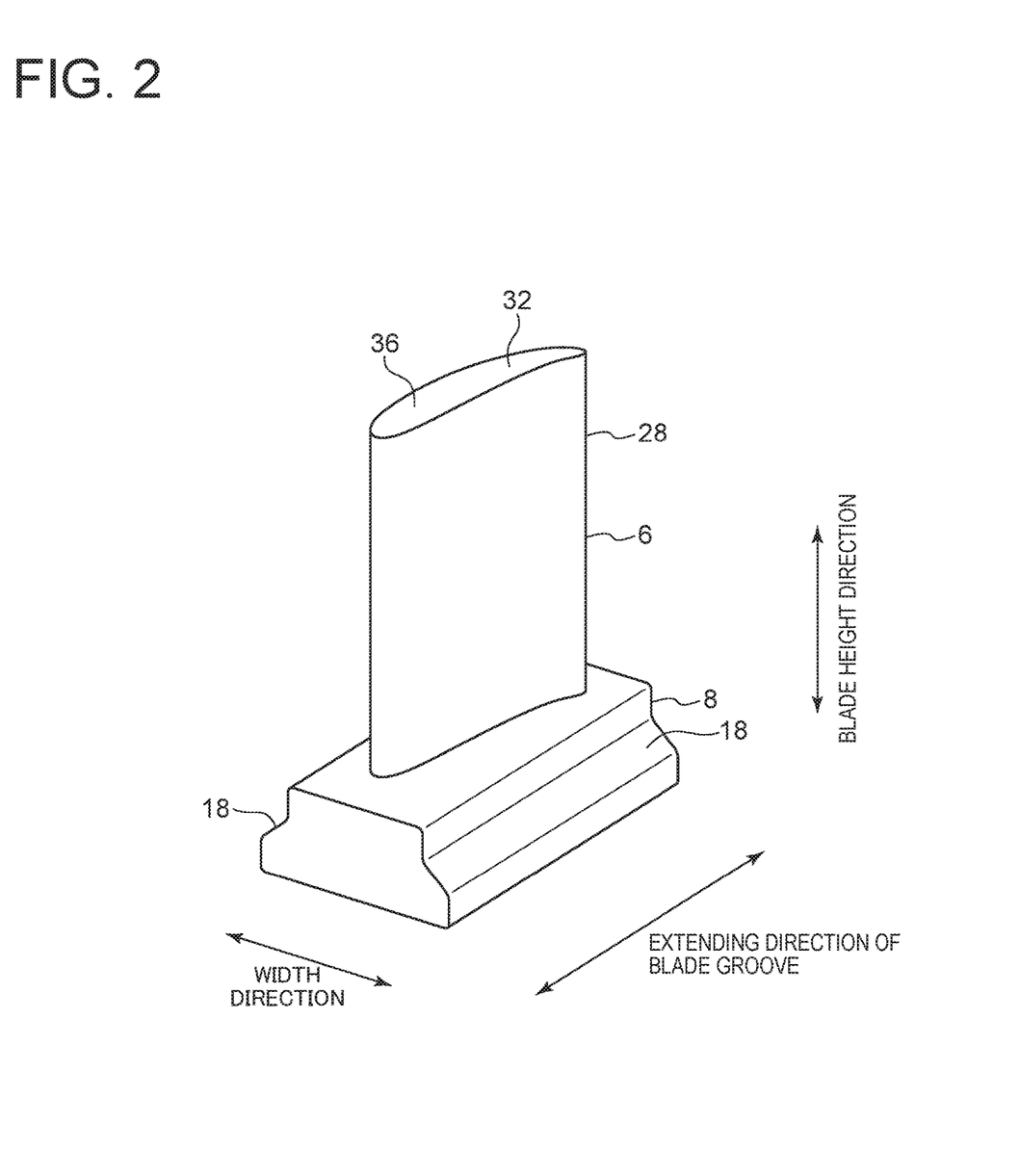
FIG. 2 is a perspective view illustrating a configuration of a blade 6.
Figure 3:
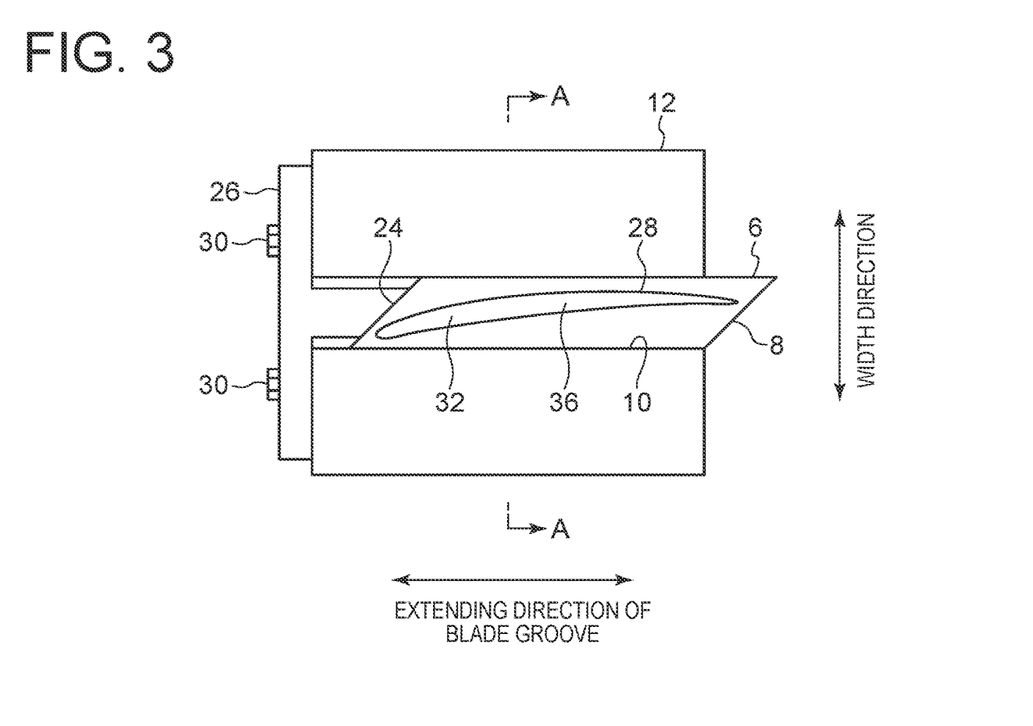
FIG. 3 is a view of a blade holder 12 in a state where a root portion 8 of the blade 6 fits into a blade groove 10 as seen from a tip side of the blade 6 along a blade height direction.
Figure 4:
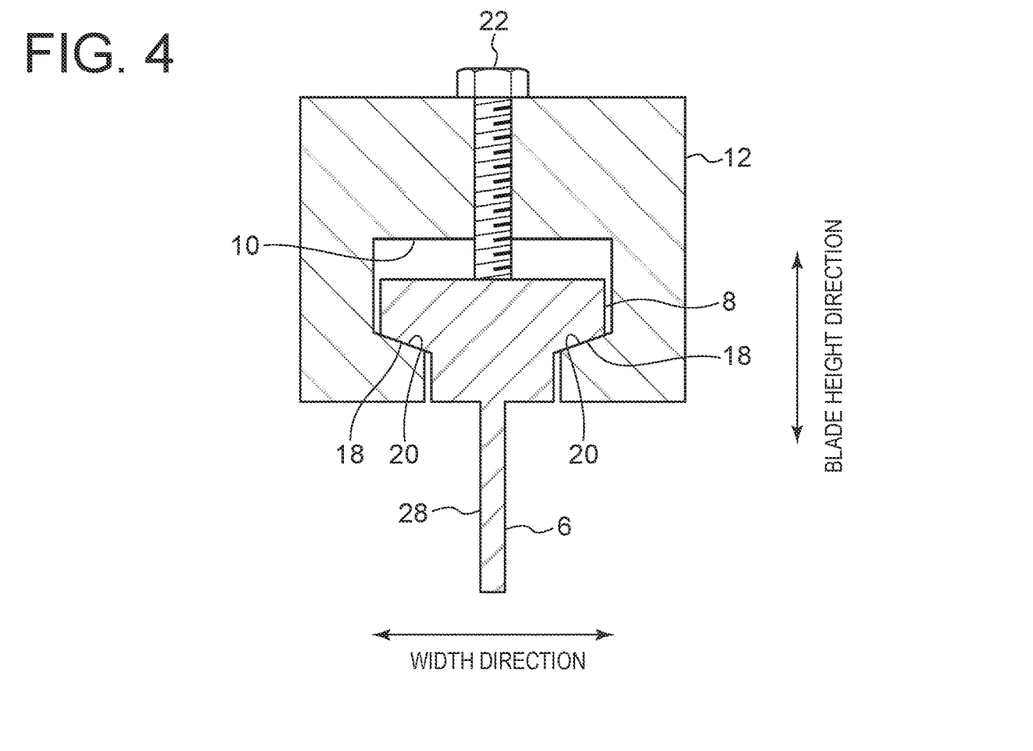
FIG. 4 is an A-A cross-sectional view in FIG. 3.
Figure 5:
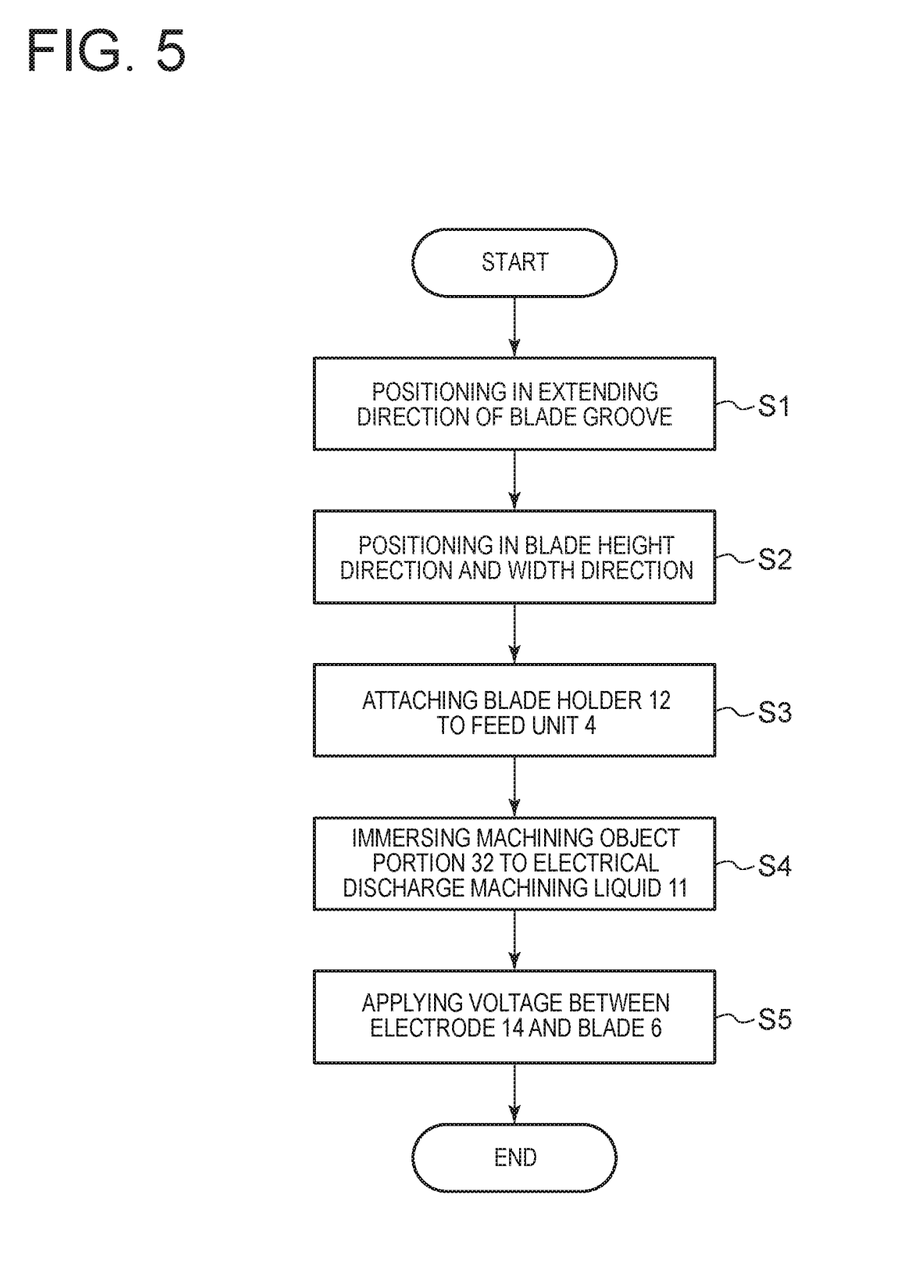
FIG. 5 is a flowchart of an example of an electrical discharge machining method.

Next, the configuration of the blade 6 and the blade holder 12 as the workpiece will be described with reference to FIGS. 2 to 4. FIG. 2 is a perspective view illustrating the configuration of the blade 6. FIG. 3 is a view of the blade holder 12 in a state where the root portion 8 of the blade 6 fits into the blade groove 10 as seen from a tip side of the blade 6 along a blade height direction. FIG. 4 is an A-A cross-sectional view in FIG. 3.

In an embodiment, as shown in FIG. 2 for instance, the blade 6 includes a blade profile 28 having a blade-shaped cross-sectional shape and the root portion 8 for mounting to the rotor, which is not shown. The root portion 8 has a width larger than a blade thickness of the blade profile 28. Herein, the "width" refers to a width in a direction orthogonal to each of the extending direction of the blade groove 10 and the blade height direction (hereinafter, referred to as width direction).

In an embodiment, as shown in FIG. 4 for instance, the blade holder 12 includes a bolt 22 as a datum part for pressing the blade 6 toward the wall surface 20 such that the bearing surface 18 of the root portion 8 of the blade 6 is brought into contact with the wall surface 20 of the blade groove 10. The bearing surface 18 is a surface coming into contact with the rotor, which is not shown, when the blade 6 is mounted on the rotor.

Further, as shown in FIG. 4 for instance, the bearing surface 18 of the typical blade 6 extends obliquely with respect to the blade height direction. Thus, as described above, if the bearing surface 18 of the root portion 8 is brought into contact with the wall surface 20 of the blade groove 10, the blade 6 is positioned with respect to not only the blade height direction but also the width direction of the root portion 8 of the blade 6. Accordingly, it is possible to improve accuracy of electrical discharge machining.

Further, in the embodiment shown in the drawings, a pair of the bearing surfaces 18 is formed in the root portion 8. The pair of bearing surfaces 18 is inclined with respect to the blade height direction so that the interval between the pair of bearing surfaces 18 becomes narrow toward the blade tip side. Further, a pair of wall surfaces 20 contacting with the pair of bearing surfaces 18 is formed in the blade groove 10. The pair of wall surfaces 20 is inclined with respect to a depth direction of the blade groove 10 (blade height direction) so that the interval between the pair of wall surfaces 20 becomes narrow toward an opening side of the blade groove 10 (blade tip side).

In an embodiment, as shown in FIGS. 3 and 4, the electrical discharge machining device 2 further comprises a datum block 26 configured to be at least partially inserted into the blade groove 10 of the blade holder 12 such that one end face 24 of the root portion 8 of the blade 6 in the extending direction of the blade groove 10 is brought into contact with the datum block 26. In the depicted illustrative embodiment, the datum block 26 is fixed to the blade holder 12 by a plurality of bolts 30.

With the above configuration, the one end face 24 of the root portion 8 of the blade 6 is brought into contact with the datum block 26, then the blade 6 can be positioned with respect to the extending direction of the blade groove 10. Accordingly, it is possible to improve accuracy of electrical discharge machining.

Next, with reference to FIGS. 5 to 10, an example of an electrical discharge machining method for machining the blade 6 as the workpiece described above by the electrical discharge machining device 2 will be described.

Figure 6:
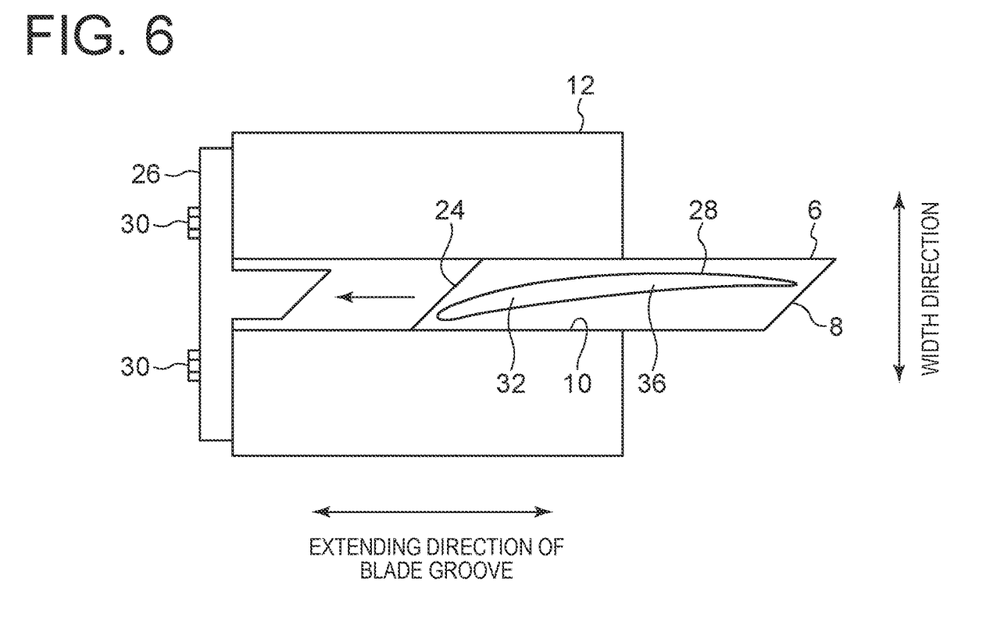
FIG. 6 is a diagram for describing a step of positioning of the blade 6 in an extending direction of the blade groove.

First, in step S1, as shown in FIG. 6, the root portion 8 of the blade 6 is inserted into the blade groove 10 of the blade holder 12, and one end face 24 of the root portion 8 of the blade 6 in the extending direction of the blade groove 10 is brought into contact with the datum block 26. Thus, the blade 6 can be positioned relative to the blade holder 12 with respect to the extending direction of the blade groove 10.

Figure 7:
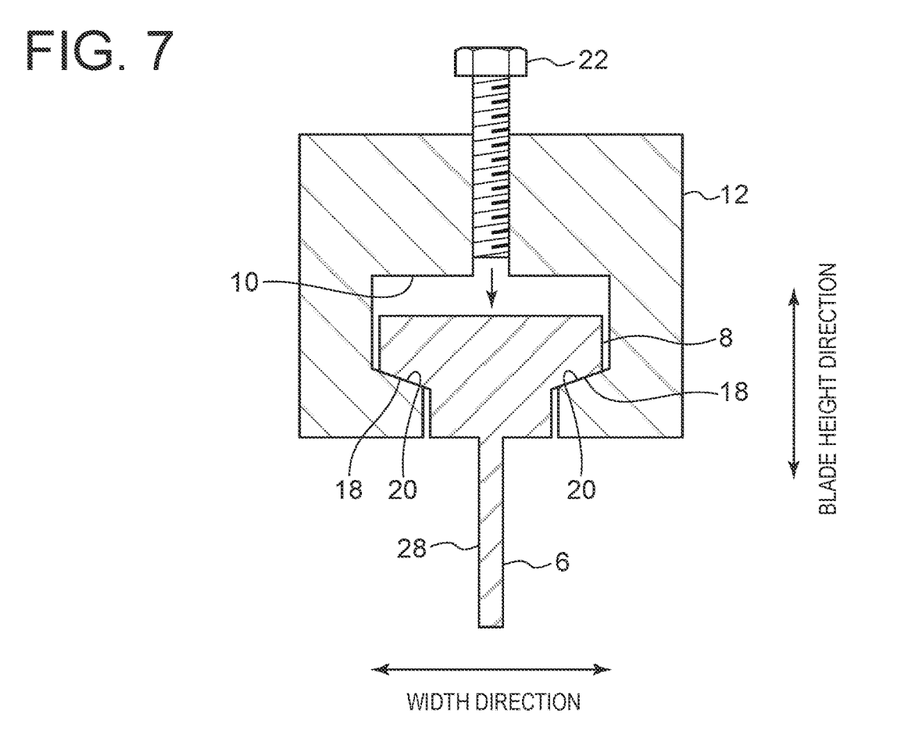
FIG. 7 is a diagram for describing a step of positioning of the blade 6 in a blade height direction and a width direction.

Next, in step S2, as shown in FIG. 7, the blade 6 is pressed by the bolt 22 provided in the blade holder 12 such that the bearing surface 18 of the root portion 8 is brought into contact with the wall surface 20 of the blade groove 10. Thus, the blade 6 can be positioned relative to the blade holder 12 with respect to the blade height direction and the width direction.

Figure 8:
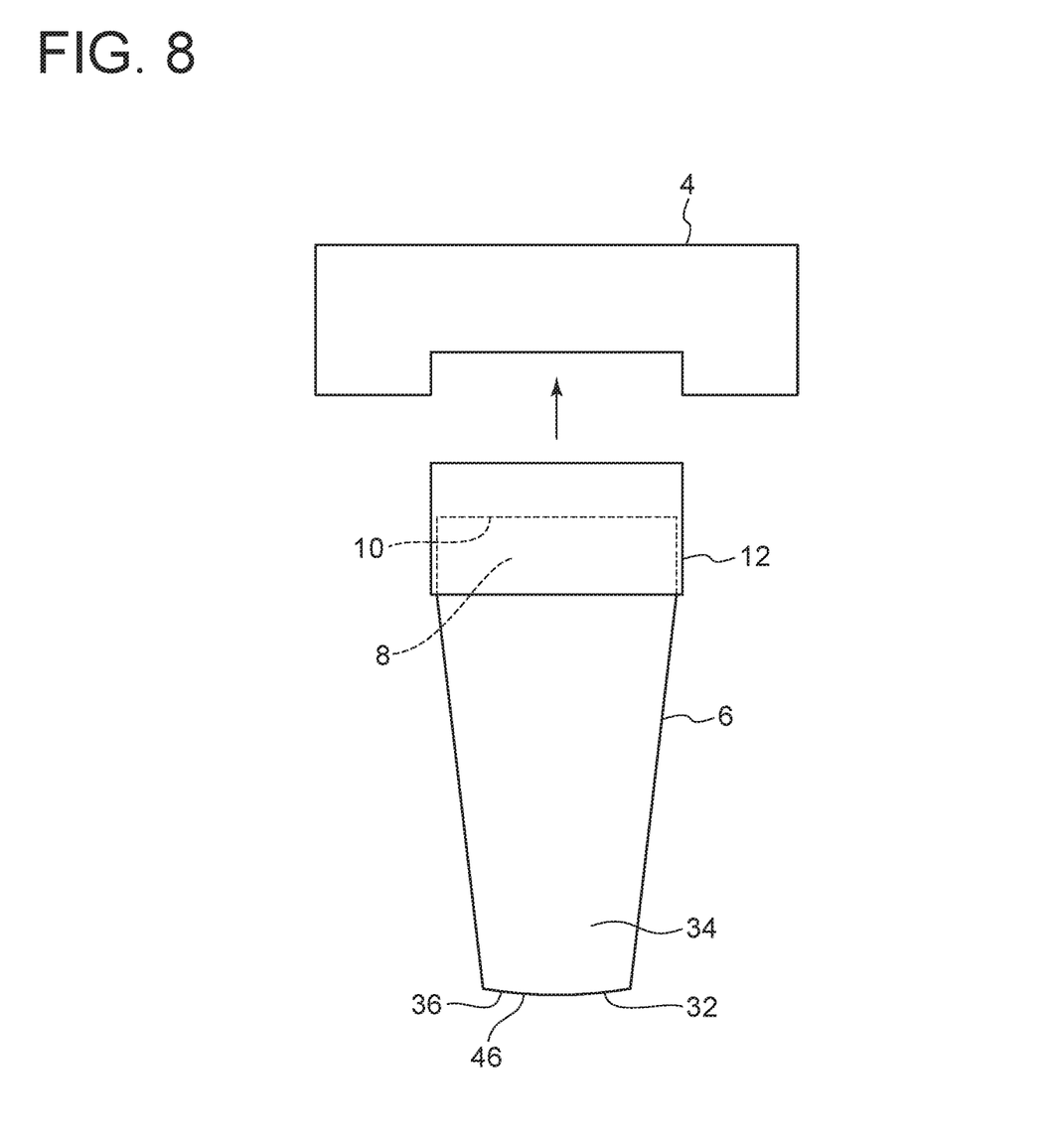
FIG. 8 is a diagram for describing a step of fixing a blade holder 12 to a feed unit.

Next, in step S3, as shown in FIG. 8, the blade 6 is attached to the feed unit 4 via the blade holder 12 by fixing the blade holder 12 to the feed unit 4 of the electrical discharge machining device 2.

Figure 9:
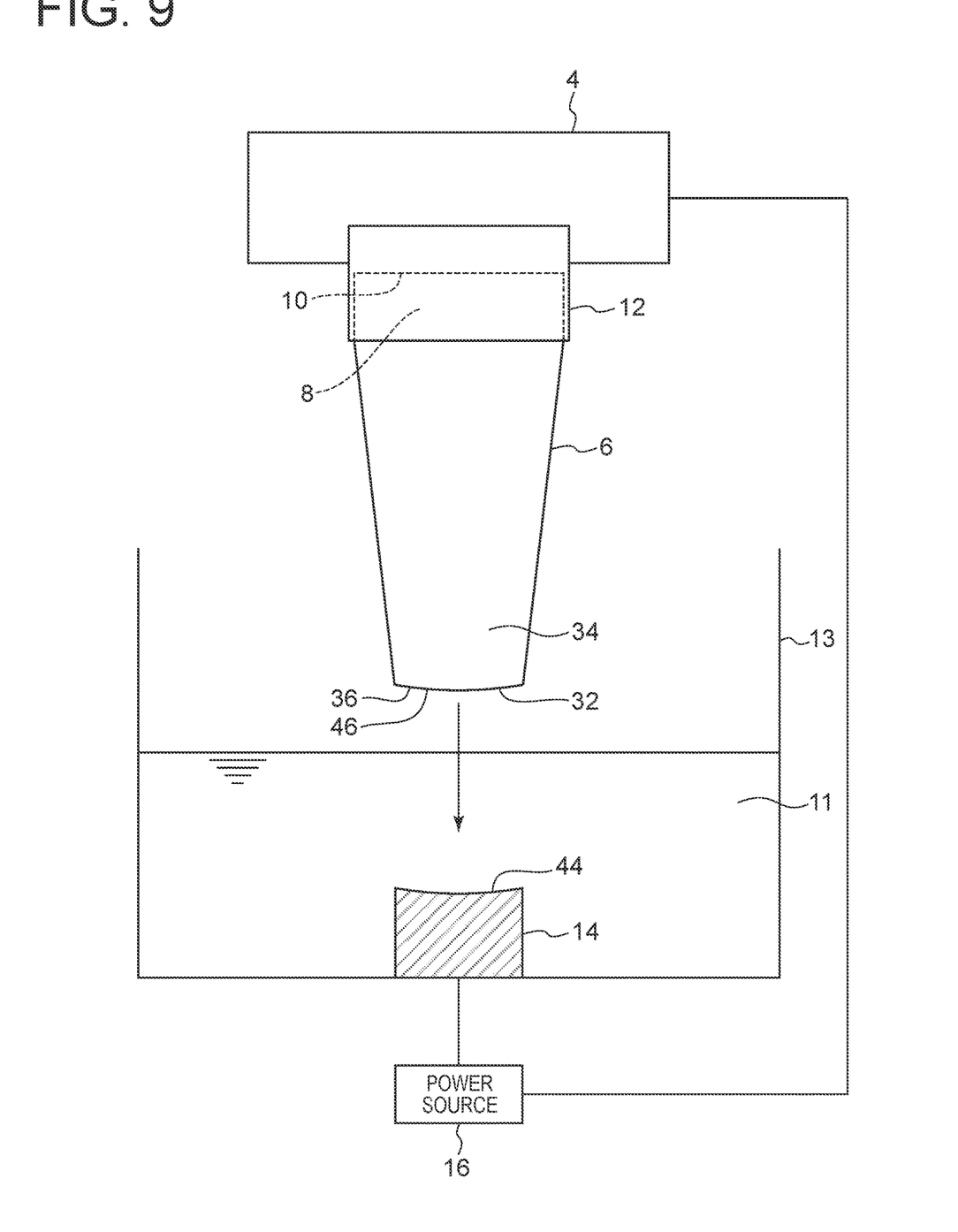
FIG. 9 is a diagram for describing a step of immersing a portion 34 of the blade 6, which includes a machining object portion 32, in an electrical discharge machining liquid 11.

Next, in step S4, as shown in FIG. 9, only the portion 34 of the blade 6 which includes the machining object portion 32 is selectively immersed in the electrical discharge machining liquid 11 such that a lower surface 46 (blade tip surface 36 in the depicted embodiment) of the machining object portion 32 of the blade 6 is opposed to an upper surface 44 of the electrode 14 immersed in the electrical discharge machining liquid 11. That is, in step S4, the feed unit 4 makes the blade 6 approach the electrode 14 from above the electrode such that the lower surface 46 of the machining object portion 32 of the blade 6 is opposed to the upper surface 44 of the electrode 14 while the electrode 14 is kept stationary. In the illustrated example, only the portion 34 on the tip side of the blade 6 relative to the root portion 8 is immersed in the electrical discharge machining liquid.

Figure 10:
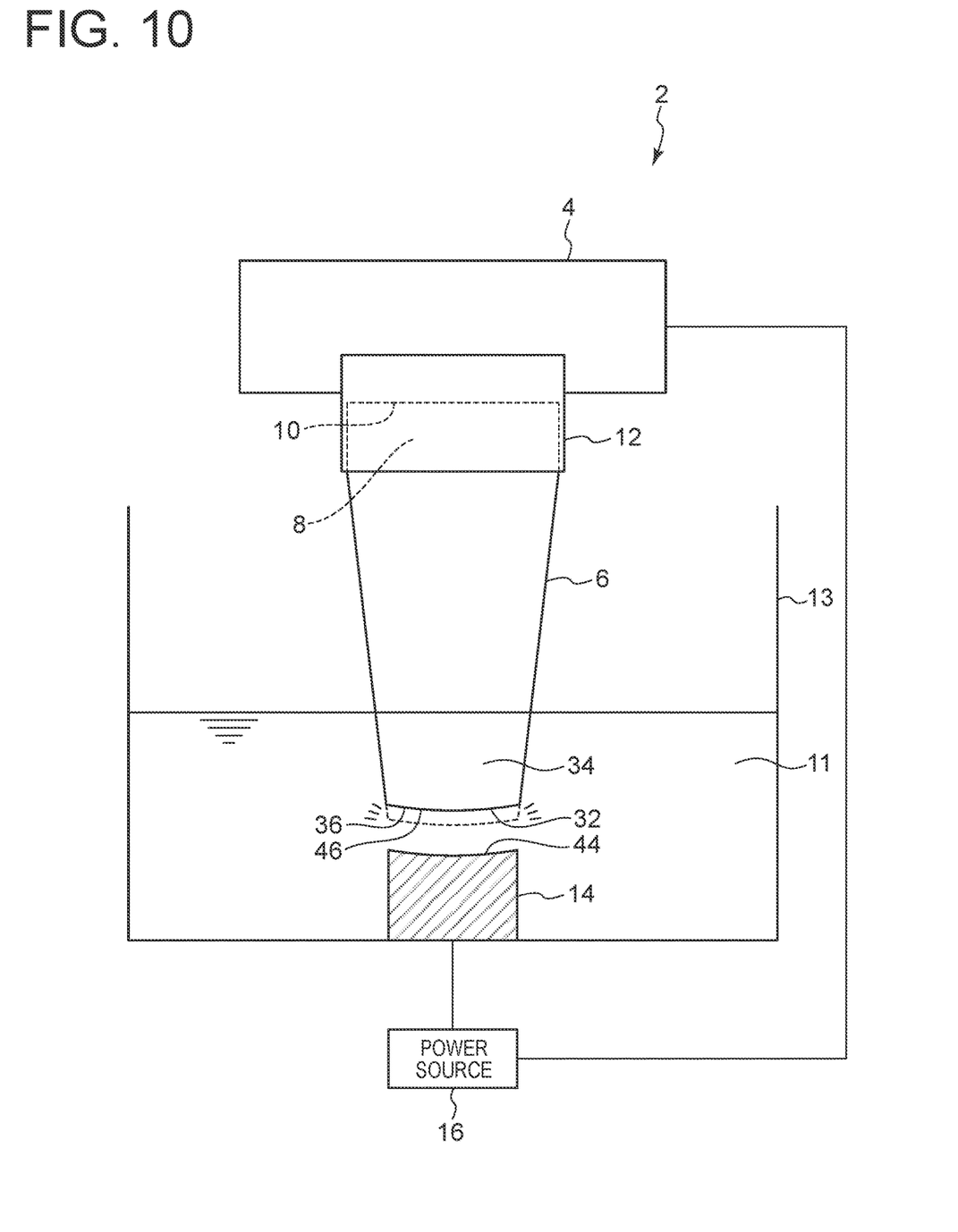
FIG. 10 is a diagram for describing a step of applying a voltage between an electrode 14 and the blade 6.

Next, in step S5, as shown in FIG. 10, the electrical discharge machining is performed on the machining object portion 32 by applying the voltage between the electrode 14 and the blade 6 in a state where the portion 34 described above of the blade 6 is selectively immersed in the electrical discharge machining liquid 11. In the illustrated example, the electrical discharge machining is performed on the blade tip surface 36 as the machining object portion 32 of the blade 6. Accordingly, the blade tip surface 36 is machined into a curved convex shape as an inverted shape corresponding to a curved concave shape of the upper surface 44 of the electrode 14.

According to the electrical discharge machining method described above, the electrical discharge machining is performed in a state where the only portion 34 of the blade 6, which includes the machining object portion 32, as the workpiece is selectively immersed in the electrical discharge machining liquid 11, thus, it is possible to reduce time and cost required for the cleaning process of the blade 6 after the electrical discharge machining.

Further, the method is different from the typical electrical discharge machining method, the blade 6 instead of the electrode is attached to the feed unit 4 of the electrical discharge machine device 2 so that the blade 6 is capable of moving. Then, it is possible to easily realize the electrical discharge machining in a state where only the portion 34 described above of the blade 6 is selectively immersed in the electrical discharge machining liquid 11. Accordingly, it is possible to easily reduce time and cost required for the cleaning process of the blade 6 after the electrical discharge machining.

Further, performing the electrical discharge machining on the blade tip surface 36 of the desired shape as the machining object portion 32 does not require the above-described curing operation needed for performing the grinding process which is a typical machining method for the blade tip surface 36. Thus, it is possible to reduce time and cost required for machining the blade tip surface 36.

Further, when a coating is applied to the bearing surface 18 of the root portion 8 of the blade 6 for the purpose of preventing seizure, it is not necessary for cleaning the root portion 8 by not immersing the root portion 8 in the electrical discharge machining liquid 11.

In an embodiment, the blade 6 as the workpiece may be a rotor blade of a downstream stage of a compressor of a gas turbine which is not shown.

In this case, since the compressor rotor blade of the downstream stage which is comparatively light-weight is used as the processing object, the blade 6 can be attached to the feed unit 4 of the electrical discharge machine device 2 while satisfying constraints caused by specifications of the electrical discharge machining device 2. Further, the blade 6 is attached to the feed unit 4 of the electrical discharge machine device 2, thus, it is possible to easily realize the electrical discharge machining in a state where only the portion 34 of the blade 6 which includes the machining object portion 32 is selectively immersed in the electrical discharge machining liquid 11.

Figure 11:
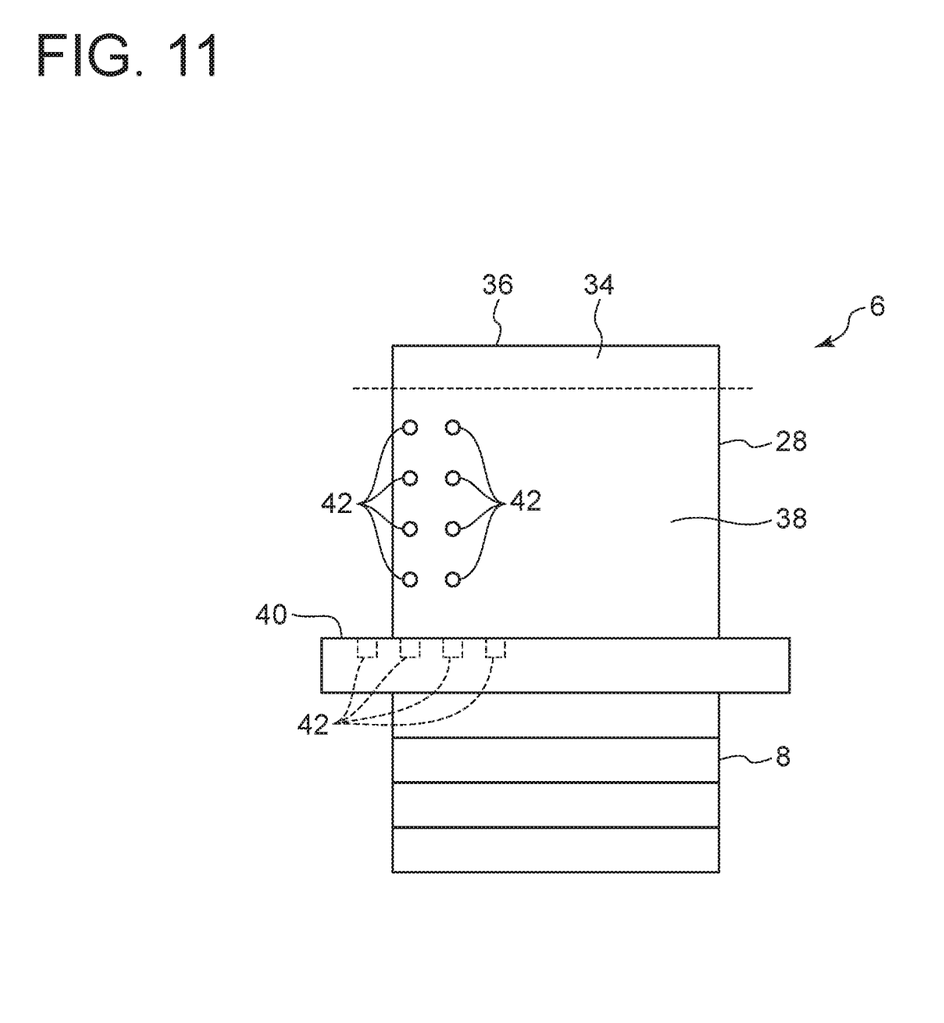
FIG. 11 is a diagram for describing the portion 34 of the blade 6 which immerses in the electrical discharge machining liquid 11 if the blade 6 is a turbine blade.

In an embodiment, the blade 6 as the workpiece may be a turbine blade of a gas turbine. In this case, as shown in FIG. 11, the electrical discharge machining may be performed on the blade tip surface 36 while only the tip portion of the blade 6 as the portion 34 which includes the machining object portion 32 is immersed in the electrical discharge machining liquid 11 so as not to prevent the electrical discharge machining liquid 11 from entering a cooling hole 42 provided on the blade profile 38 or the platform 40 of the blade 6.

The present invention is not limited to the embodiments described above, but includes embodiments composed of variations of the embodiments described above, and embodiments composed of proper combinations of those embodiments.

For instance, in the electrical discharge machining method described above, while a case where the electrical discharge machining is performed on the blade tip surface 36 is described as an example, the present invention is applicable to a case of performing the electrical discharge machining on the machining object portion other than the blade tip surface and is applicable to a case where the electrical discharge machining is performed on the workpiece other than the blade.

That is, in an embodiment, the method may comprise: a step of selectively immersing only the portion of the workpiece, which includes the machining object portion, in the electrical discharge machining liquid such that the machining object portion of the workpiece is opposed to the electrode immersed in the electrical discharge machining liquid and a step of applying the electrical discharge machining to the machining object portion by applying the voltage between the electrode and the workpiece in a state where the portion of the workpiece, which includes the machining object portion, is selectively immersed in the electrical discharge machining liquid.

In this way, since the electrical discharge machining is performed in a state where only the portion of the workpiece, which includes the machining object portion, is selectively immersed in the electrical discharge machining liquid, it is possible to reduce time and cost required for the cleaning process of the workpiece after the electrical discharge machining.

REFERENCE SIGNS LIST

2 Electrical discharge machining device
4 Feed unit
6 Blade
8 Root portion
10 Blade groove
11 Electrical discharge machining liquid
12 Blade holder
13 Container
14 Electrode
16 Power source
18 Bearing surface
20 Wall surface
22 Bolt
24 End face
26 Datum block
28 Blade profile
32 Machining object portion
34 Portion
36 Blade tip surface
38 Blade profile
40 Platform
42 Cooling hole
44 Upper surface
46 Lower surface

The invention claimed is:

1. An electrical discharge machining method, comprising:
   selectively immersing only a portion of a blade in an electrical discharge machining liquid such that a blade tip surface included in the portion of the blade is opposed to an electrode immersed in the electrical discharge machining liquid;
   applying an electrical discharge machining to the blade tip surface by applying a voltage between the electrode and the blade in a state where the portion of the blade is selectively immersed in the electrical discharge machining liquid;
   fitting a root portion of the blade into a blade groove of a blade holder and attaching the blade to a feed unit of an electrical discharge machine via the blade holder; and
   pressing the blade by a datum part provided on the blade holder such that a bearing surface of the root portion of the blade contacts a wall surface of the blade holder,
   wherein, in the selectively immersing only the portion of the blade in the electrical discharge machining liquid, the blade moves to the electrode by the feed unit.

2. The electrical discharge machining method according to claim 1,
   wherein the electrode is kept stationary while the blade moves to the electrode by the feed unit.

3. The electrical discharge machining method according to claim 1,
   wherein the blade moves to the electrode by the feed unit from above the electrode such that the blade tip surface is opposed to an upper surface of the electrode.

4. The electrical discharge machining method according to claim 1, wherein the blade is a blade for a downstream stage of a compressor of a gas turbine.

5. An electrical discharge machining method, comprising:

selectively immersing only a portion of a blade in an electrical discharge machining liquid such that a blade tip surface included in the portion of the blade is opposed to an electrode immersed in the electrical discharge machining liquid;

applying an electrical discharge machining to the blade tip surface by applying a voltage between the electrode and the blade in a state where the portion of the blade is selectively immersed in the electrical discharge machining liquid;

fitting a root portion of the blade into a blade groove of a blade holder and attaching the blade to a feed unit of an electrical discharge machine via the blade holder; and bringing one end face of the root portion of the blade in an extending direction of the blade groove of the blade holder into contact with a datum block inserted into the blade groove of the blade holder, wherein, in the selectively immersing only the portion of the blade in the electrical discharge machining liquid, the blade moves to the electrode by the feed unit.

6. An electrical discharge machining device for a blade, the electrical discharge machining device comprising:

a feed unit;

a blade holder attached to the feed unit and having a blade groove into which a root portion of the blade is fittable;

an electrode immersed in an electrical discharge machining liquid; and a power source for applying a voltage between the blade and the electrode, wherein the blade holder includes a pressing member for pressing the blade toward a wall surface of the blade holder such that a bearing surface of the root portion of the blade is brought into contact with the wall surface of the blade holder.

7. An electrical discharge machining device for a blade, the electrical discharge machining device comprising:

a feed unit;

a blade holder attached to the feed unit and having a blade groove into which a root portion of the blade is fittable;

an electrode immersed in an electrical discharge machining liquid;

a power source for applying a voltage between the blade and the electrode; and a datum block configured to be at least partially inserted into the blade groove of the blade holder such that one end face of the root portion of the blade in an extending direction of the blade groove of the blade holder is brought into contact with the datum block.

8. An electrical discharge machining device for a blade, the electrical discharge machining device comprising:

a feed unit;

a blade holder attached to the feed unit and having a blade groove into which a root portion of the blade is fittable;

an electrode immersed in an electrical discharge machining liquid; and a power source for applying a voltage between the blade and the electrode, wherein:

an upper surface of the electrode includes a curved concave surface shape; and a height of the upper surface of the electrode decreases from both ends of the electrode in a horizontal direction to a center of the electrode in the horizontal direction.

* * * * *